July 15, 1947.  T. KASKOURAS  2,424,098
TOOTHBRUSH HOLDER
Filed March 23, 1946
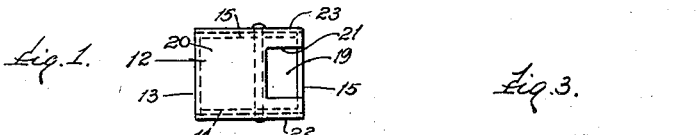
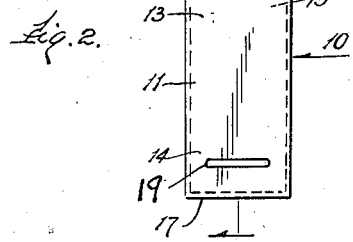
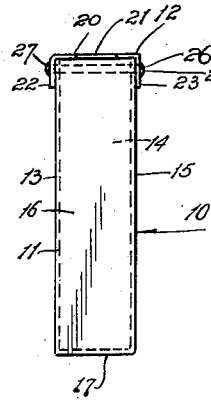
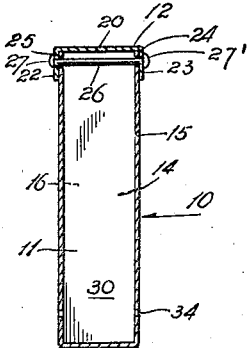
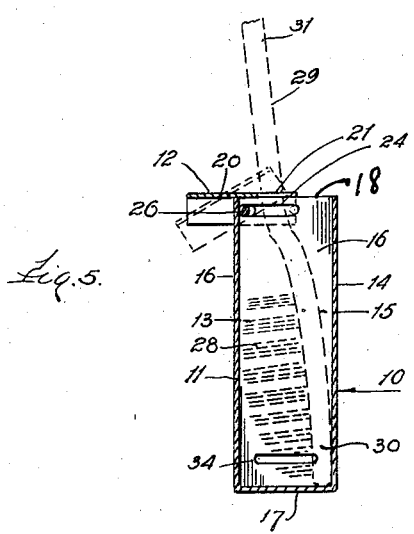
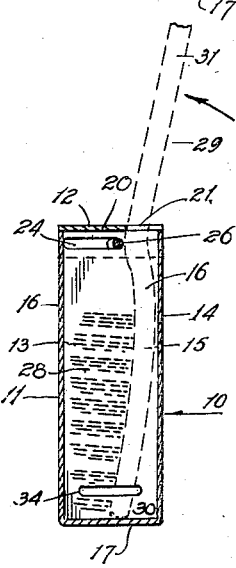
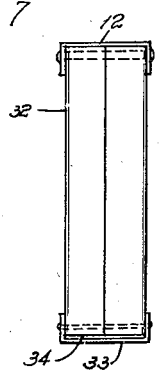
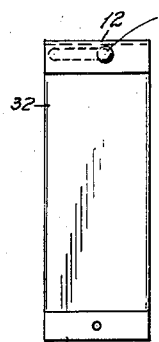
Inventor.
Thomas Kaskouras.
by James C. McKnight
Attorney.

Patented July 15, 1947

2,424,098

UNITED STATES PATENT OFFICE 2,424,098

TOOTHBRUSH HOLDER

Thomas Kaskouras, Chicago, Ill.

Application March 23, 1946, Serial No. 656,618

1 Claim. (Cl. 206—15.1)

My invention relates to a holder for inclosing the bristle portion of a tooth brush.

Among the objects of this invention is to provide a tooth brush holder which is portable, opened by moving the handle of the tooth brush and which when closed will protect the bristle portion of the tooth brush. My holder is quickly and easily used, is lasting in wear and because it has no complicated mechanism is economical of manufacture.

My invention also contemplates such other objects, advantages and capabilities as are inherently possessed by my invention and which will later more fully appear.

While I have show in the accompanying drawings preferred forms of my invention, yet I wish it understood that the same are susceptible of modification and change without departing from the spirit of my invention.

Referring to the drawings, Fig. 1 is a top plan view; Fig. 2 is a side elevational view; Fig. 3 is front elevational view; Fig. 4 is a sectional view on line 4—4 of Fig. 2. Fig. 5 is a sectional view in open position and Fig. 6 is a similar view in closed position, both views showing an inserted tooth brush; Fig. 7 is an elevational view of another embodiment, and Fig. 8 is a side elevational view of the same.

An embodiment selected to illustrate my invention comprises a holder 10, having a container portion 11, and a top member 12.

The container portion 11 has side walls 13, 14, 15 and 16, a closed bottom 17 and an open top 18. Adjacent the lower part of side walls 13 and 15 are ventilation openings 19.

The top member 12 has a top 20 with an opening 21 at one end and a pair of spaced downwardly extending flanges 22 and 23 positioned to contact the upper portions of opposite walls 13 and 15. Said walls 13 and 15 have slots 24 and 25 through which extends rod 26, the opposite ends 27 and 27' of which are attached to flanges 22 and 23.

In use, let us assume that top member 12 is in open position. The bristle portion 28 of tooth brush 29 is inserted into opening 21 which is of sufficient size to receive it positioned within the hollow interior 30 of container 11. The user slides top member 12 to closed position, firmly securing tooth brush head 28 within container 11, since flanges 22 and 23 bear against walls 13 and 15 with friction grip. The tooth brush 29 may then be freely carried in the pocket, purse or traveling bag of the user, safe from contamination. The bristles 28 cannot touch anything, and if moist will dry while carried in the container. Tooth brushes prior to sale could be safely transported and displayed in my holder.

When the user desires to remove the tooth brush from the holder, he merely grasps the handle 31 with one hand, holding the container 11 in the other hand, and applies outward pressure on the handle. This will push top member 12 to open position, so that the tooth brush may be freely withdrawn from the container. This leaves the holder in open position so that the tooth brush may then be returned to the container, after use.

In a slightly different embodiment of my invention, my container portion consists of a hollow tube 32, with the bottom closed by an overlapping end portion 33 slightly spaced to provide air openings 34.

Having thus described my invention, I claim:

A toothbrush holder comprising a body member having front, back and side portions and an open top and an open bottom, an overlapping member having right angle flanges attached to the front and back portions of said body member and extending slightly below the open bottom of said body member for substantially closing the same, but leaving small air ventilation openings below the side portions of said body member, said open top of a size to accommodate a tooth brush head, a closure having opposite flanges engaging the upper part of said container portion, said closure having a top portion with an opening, substantially the size of a tooth brush handle, said upper part of said container portion having opposite slots and a rod extending through said slots and attached to said flanges, said closure slidable on said container portion to closed position to hold the head of a tooth brush inserted within said container portion, said closure slidable to open position upon receipt of outward pressure from the handle of the tooth brush to permit withdrawal of the tooth brush head.

THOMAS KASKOURAS.

REFERENCES CITED

The following references are of record in the file of this patent:

UNITED STATES PATENTS

| Number | Name | Date |
|---|---|---|
| 1,651,496 | Weinberg | Dec. 6, 1927 |
| 2,030,134 | Burgener | Feb. 11, 1936 |
| 1,213,235 | Meiers | Jan. 23, 1917 |

FOREIGN PATENTS

| Number | Country | Date |
|---|---|---|
| 180,183 | Germany | Sept. 18, 1905 |